United States Patent [19]

Inoue

[11] 4,251,761
[45] Feb. 17, 1981

[54] NUMERICAL CONTROL ERROR COMPENSATING SYSTEM

[75] Inventor: Tsuyoshi Inoue, Hino, Japan
[73] Assignee: Fujitsu Fanuc Limited, Hino, Japan
[21] Appl. No.: 26,303
[22] Filed: Apr. 2, 1979
[30] Foreign Application Priority Data Apr. 3, 1978 [JP] Japan ................................. 53-39030

[51] Int. Cl.³ ............................................ G05B 11/01
[52] U.S. Cl. ..................................... 318/630; 318/632
[58] Field of Search ................................. 318/630, 632

[56] References Cited

U.S. PATENT DOCUMENTS

| | | | |
|---|---|---|---|
| 3,560,830 | 2/1971 | Steinberg | 318/630 |
| 3,766,461 | 10/1973 | Leenhouts | 318/630 |
| 3,886,424 | 5/1975 | Hoshina et al. | 318/630 |

*Primary Examiner*—B. Dobeck
*Attorney, Agent, or Firm*—Staas & Halsey

[57] ABSTRACT

A positioning error, relative to a command value, is premeasured for forward and backward movements of a movable machine part and is set in an error setting means. When the movable machine part is moved in accordance with the command value, the error information set in the error setting means corresponding to the commanded direction of movement is read out to compensate for an error. When the direction of movement of the movable machine part is reversed, integrated contents of the error information, set in the error setting means, are added to the amount of backlash to compensate for an error.

11 Claims, 6 Drawing Figures

POSITIVE DIRECTION

POSITIVE DIRECTION

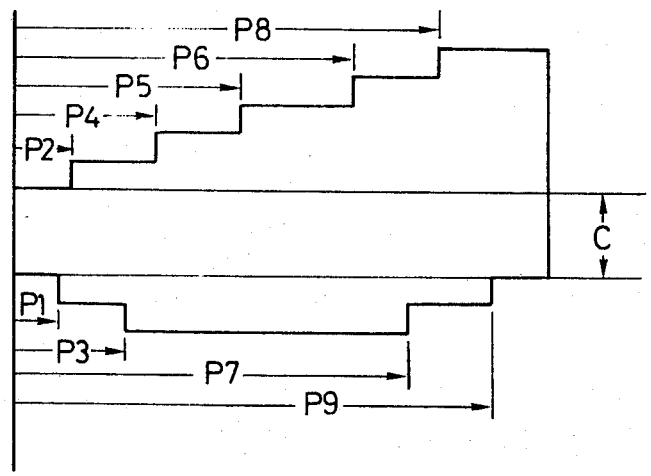

NUMERICAL CONTROL ERROR COMPENSATING SYSTEM

BACKGROUND OF THE INVENTION

1. Field of the Invention

This invention relates to a numerical control error compensating system for compensating for an error which results from backlash, a pitch error, etc. of a machine placed under numerical control.

2. Description of the Prior Art

In the case of positioning by numerical control, it is customary to shift a movable part of a machine to a commanded position by the drive of a feed screw. When the feed screw is long, it is supported by bearings so as to be unmovable in its axial direction, for example, on the driving side but movable in the axial direction on the opposite side, whereby bending of the screw due to its expansion is prevented. Because of this feed screw bearing arrangement, positioning errors resulting from expansion of the feed screw differ greatly with feed direction; to avoid this, a high-diametered feed screw of large rigidity is used but such a feed screw is very expensive.

Furthermore, when the movable part is moved, by the feed screw, along its length of travel, a nonuniform distribution of pitch errors and an error distribution differing for each direction of feed due to the above-mentioned expansion of the feed screw and so are often encountered; in particular, error curves in a forward and a backward feed do not bear a symmetrical relation to each other. If a machine, having such an error characteristic, is placed under numerical control, for example, when the forward movement to a commanded position is followed by the backward movement, then even if some backlash compensation is conducted, no complete error compensation can be achieved because of a difference in the amount of error at the position of reversal of the direction between the forward and backward movements. This difference is on the pitch errors therein etc. One cause of the change in the positioning error with the position of the movable part is that the load on the feed screw varies with the position of the movable part.

SUMMARY OF THE INVENTION

An object of this invention is to provide a numerical control error compensating system which compensates for errors to ensure highly accurate numerical control even if the error characteristics of a movable part of a machine differ with its direction of movement.

Another object of this invention is to provide a numerical control error compensating system which has high accuracy error compensation when the direction of movement of a movable part of a machine is reversed.

Briefly stated, in the numerical control error compensating system of this invention, error information, obtained by premeasuring a positioning error relative to a command value, is set in error setting means. The error information corresponds to the position of a movable part of a machine and when the movable part is moved in accordance with the command value, the error information is read out of the error setting means for achieving an error compensation. The error setting means is provided for forward and backward movements of the movable part of the machine and means are provided for integrating the error information respectively corresponding to the forward and backward movements. When the movable machine part is moved in accordance with the command value, an error compensation is conducted on the basis of the error information read out of the error setting means corresponding to the commanded direction of travel. When the direction of travel of the movable machine part is reversed, integrated contents of the integrating means are added to the amount of backlash for an error compensation.

BRIEF DESCRIPTION OF THE DRAWINGS

FIG. 4 is a diagram illustrating error information;

FIG. 5 is a diagram illustrating the contents of a memory used in the embodiment of FIG. 3.

DESCRIPTION OF THE PREFERRED EMBODIMENTS

Figure 1:
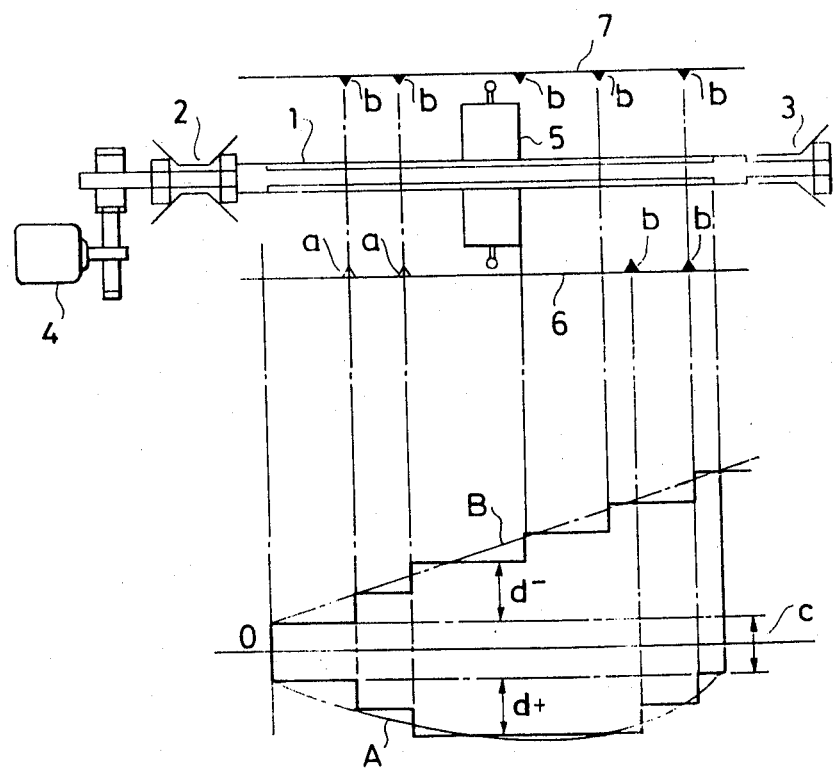
FIG. 1 is a diagram which explains of the principle of this invention.

In FIG. 1 reference numeral 1 indicates a feed screw; 2 designates a bearing which supports the feed screw 2 in a manner to inhibit its movement in its axial direction; 3 identifies a bearing which supports the feed screw 2 in a manner to permit its movement in its axial direction; 4 denotes a motor; 5 represents a movable part of a machine; and 6 and 7 show dogs for forward and backward movements, a indicating dogs for providing plus compensation pulses during the forward feed and minus compensation pulses during the backward feed and b dogs for providing plus compensation pulses during the backward feed and minus compensation pulses during the forward feed. Reference character A shows an error curve in the forward feed, B an error curve in the backward feed and C an amount of backlash.

The compensation pulses produced by the dogs 6 and 7 for the forward and the backward feed are counted separately. During the forward feed compensation for a movement command value is performed by the compensation pulses from the dogs 6 and during the backward feed compensation for the movement command value is effected by the compensation pulses from the dogs 7. At the time of reversal of the direction of feed, compensation is conducted by the count values of the compensation pulses from both dogs 6 and 7.

For example, in the case of reversing the direction of feed in the state shown in FIG. 1, the sum, $(d^+ + d^- + C)$, of the count value $d^+$ of the forward compensation pulses, the count value $d^-$ of the backward compensation pulses and a constant amount of backlash C is used as a backlash compensation value. Accordingly, even if the direction of feed is reversed at any position of the feed screw in its forward or backward stroke, error compensation can be achieved along the solid-line error curves approximate to those A and B, respectively.

Figure 2:
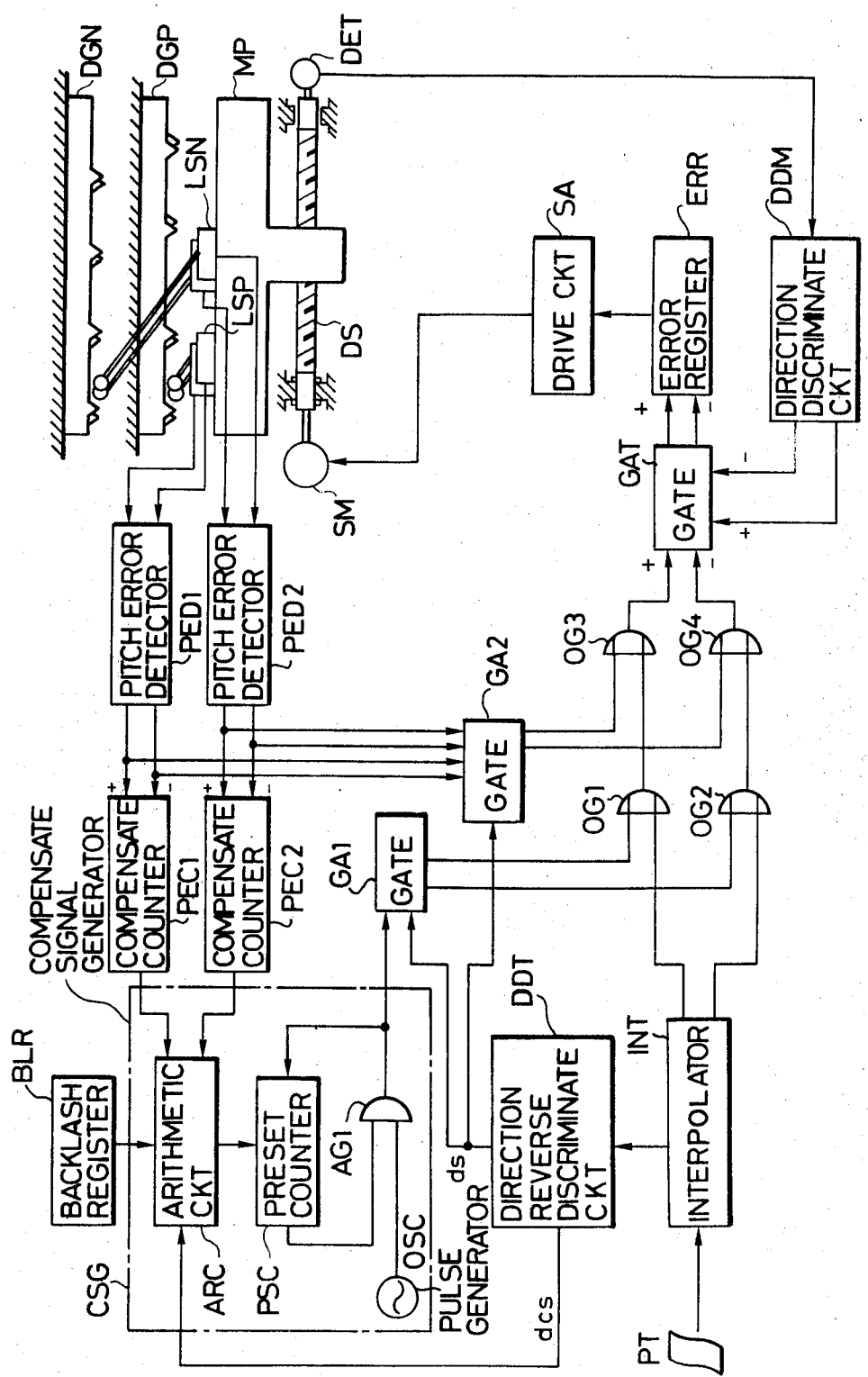
FIG. 2 is a block diagram illustrating an embodiment of this invention.

FIG. 2 illustrates in block form an embodiment of this invention. Reference characters DGP and DGN indicate dogs for the forward and the backward feed, respectively; MP designates a movable machine part; LSP and LSN identify limit switches; SM denotes a servomotor; DS represents a feed screw; DET shows a detector, such as a position coder or the like; BLR refers to a backlash register having set therein the amount of backlash C; CSG indicates a compensate signal generator; ARC designates an arithmetic circuit; PSC identifies a preset counter; OSC denotes a pulse generator; AG1 represents an AND gate; PEC1 and PEC2 show compensate counters; PED1 and PED2 refer to pitch error detectors; GA1 and GA2 indicate gate circuits; DDT designates a direction reverse discriminate circuit; PT identifies a command tape; INT denotes an interpolator; OG1 to OG4 represent OR gates; GAT shows a gate circuit; ERR refers to an error register; SA indicates a drive circuit; and DDM identifies a direction discriminate circuit.

The dogs DGP and DGN for the forward and the backward feed each comprise a plurality of pairs of dogs. On the movable machine part MP are provided the limit switches LSP and LSN which are actuated by the contact with the dogs to yield outputs following the order of arrangement of each pair of dogs. In dependence upon the order of outputs being provided, it is decided by the pitch error detectors PED1 and PED2 whether the compensation needed is in the forward or backward stroke of the feed screw DS. For the compensation in the forward feed, the contents of the compensate counters PEC1 and PEC2 are each added to 1, whereas for the compensation in the backward feed 1 is subtracted from the content of each of the counters PEC1 and PEC2, by which their contents respectively become the count values $d^+$ and $d^-$ shown in FIG. 1.

The output pulses from the pitch error detectors PED1 and PED2 are applied to the gate circuit GA2, from which the output pulse from the pitch error detector PED1 or PED2, depending upon whether the feed is forward or backward, is provided as a compensation pulse via the OR gate OG3 or OG4 and the gate circuit GAT to the error register under the control of a direction signal ds derived from the direction reverse discriminate circuit DDT.

The command tape is read by known reader means to apply a travel command value and direction-of-travel information to the interpolator INT; and the direction reverse discriminate circuit DDT produces the direction signal ds based on the information from the interpolator INT and a direction reverse signal dcs based upon discrimination of reversal of the direction of travel. The travel command value is provided to the error register ERR, whose output is applied to the drive circuit SA, the output from which is, in turn, supplied to the servomotor SA to drive it, causing the movable part MP to travel by the feed screw DS. The rotation of the feed screw DS is detected by the detector DET and its detection pulse is provided to the direction discriminate circuit DDM, in which the feed direction of the feed screws DS is discriminated by known means and whose output is applied via the gate circuit GAT to the error register ERR to drive the servomotor SM until the content of the error register ERR is reduced to zero. The pitch error of the feed screw DS is compensated for by the compensation pulse corresponding to the direction of feed. Consequently, in the case where the pitch error differs for each direction of feed, the compensation can be achieved corresponding to the error characteristic.

Upon reversal of the direction of feed, the direction reverse signal dcs is provided to the compensate signal generator CSG, which reads out the amount of backlash C from the backlash register BLR and the compensation values $d^+$ and $d^-$ from the compensate counters PEC1 and PEC2 and performs the arithmetic operation, $(C+d^+ +d^-)$, in the arithmetic circuit ARC and sets the arithmetic operation result in the preset counter PSC. As a consequence, the AND gate AG1 is opened to pass on pulses from the pulse generator OSC to the gate circuit GA1 and, at the same time, the subtraction of the preset counter PSC is conducted, by which the pulses are provided via the AND gate AG1 to the gate circuit GA1 until the content of the preset counter PSC is reduced to zero. From the gate circuit GA1 are also applied the pulses as the compensation pulses to the error register ERR through that one of the OR gates OG1 and OG2 which is selected in accordance with the direction signal ds.

As described above, the compensate pulses from the dogs DGP and DGN for the forward and backward movements are respectively integrated and, when the direction of travel is reversed, the compensation is carried out based on the sum of the amount of backlash C and the integrated values of the compensate pulse: Accordingly, even if the direction of feed is reversed at any position of the feed screw in its forward or backward stroke, it is possible to completely compensate for the error to ensure highly accurate positioning.

Figure 3:
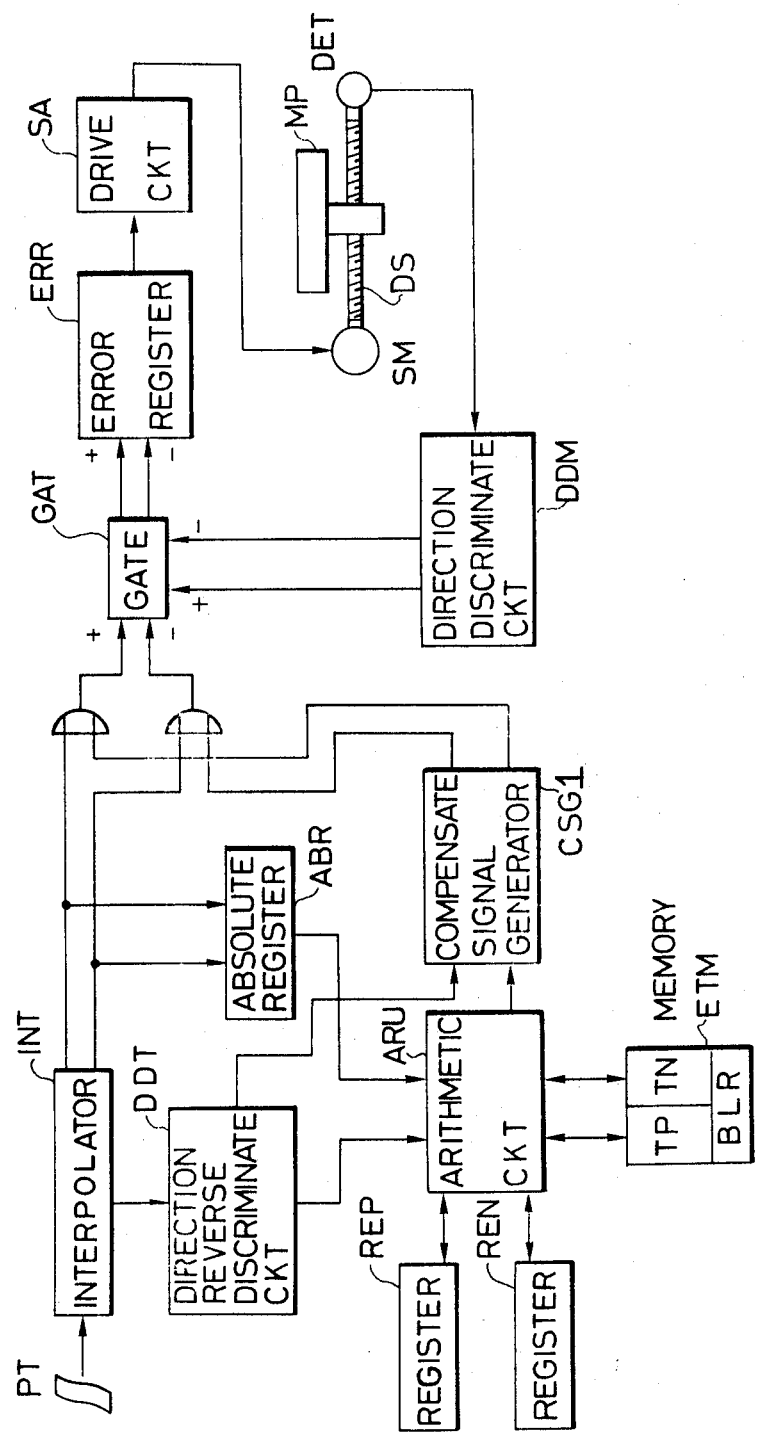
FIG. 3 is a block diagram showing another embodiment of this invention.

FIG. 3 shows in block form another embodiment of this invention, in which parts corresponding to those in FIG. 2 are identified by the same reference characters. In FIG. 3, reference characters ABR indicates an absolute register; ARU designates an arithmetic circuit; REP and REN identify registers respectively corresponding to the compensate counters PEC1 and PEC2 utilized in the embodiment of FIG. 2; and ETM denotes a memory which comprises a backlash register part BLR and forward and backward feed tables TP and TN which respectively store the error information corresponding to those available from the forward and backward dogs mentioned above.

FIGS. 4 and 5 are explanatory of the memory ETM. Assuming that errors at positions P1 to P9 from the origin are such as shown in FIG. 4, the contents of the forward and backward feed tables TP and TN of the memory ETM are such as depicted in FIG. 5.

The absolute register ABR integrates output pulses from the interpolator INT to indicate the position of the movable machine part MP from the origin. The memory ETM is read out, with the content of the interpolator INT used as address information and the direction signal from the direction reverse discriminate circuit DDT as a selection signal for the forward and backward feed tables TP and TN. For example, when the content of the absolute register ABR becomes P1 in the forward feed, +1 stored as error information at the address P1 of the forward feed table TP is read out therefrom and applied to the compensate signal generator CSG1, from which the compensation pulses are provided via the gate circuit GAT to the error register ERR.

The contents read out of the forward and backward feed tables TP and TN are respectively integrated in the registers REP and REN to achieve integration of the error information as is the case with the compensate counters PEC1 and PEC2 (refer to FIG. 2). When the direction of feed is reversed, the contents $d^+$ and $d^-$ of the registers REP and REN are read out therefrom and the amount of backlash C is read out from the backlash register BLR of the memory ETM. In the arithmetic circuit ARU, the arithmetic operation, $(d^+ +d^- +C)$, are carried out and the operation results is applied to the compensate signal generator CSG1 to perform the compensation for the error.

With this embodiment, it is possible to electronically set the error information and effect the error compensation based on the error information without including any mechanical parts, such as the dogs used in the embodiment of FIG. 2. The amount of compensation can also be selected to be a desired value other than +1 or −1.

Figure 6:
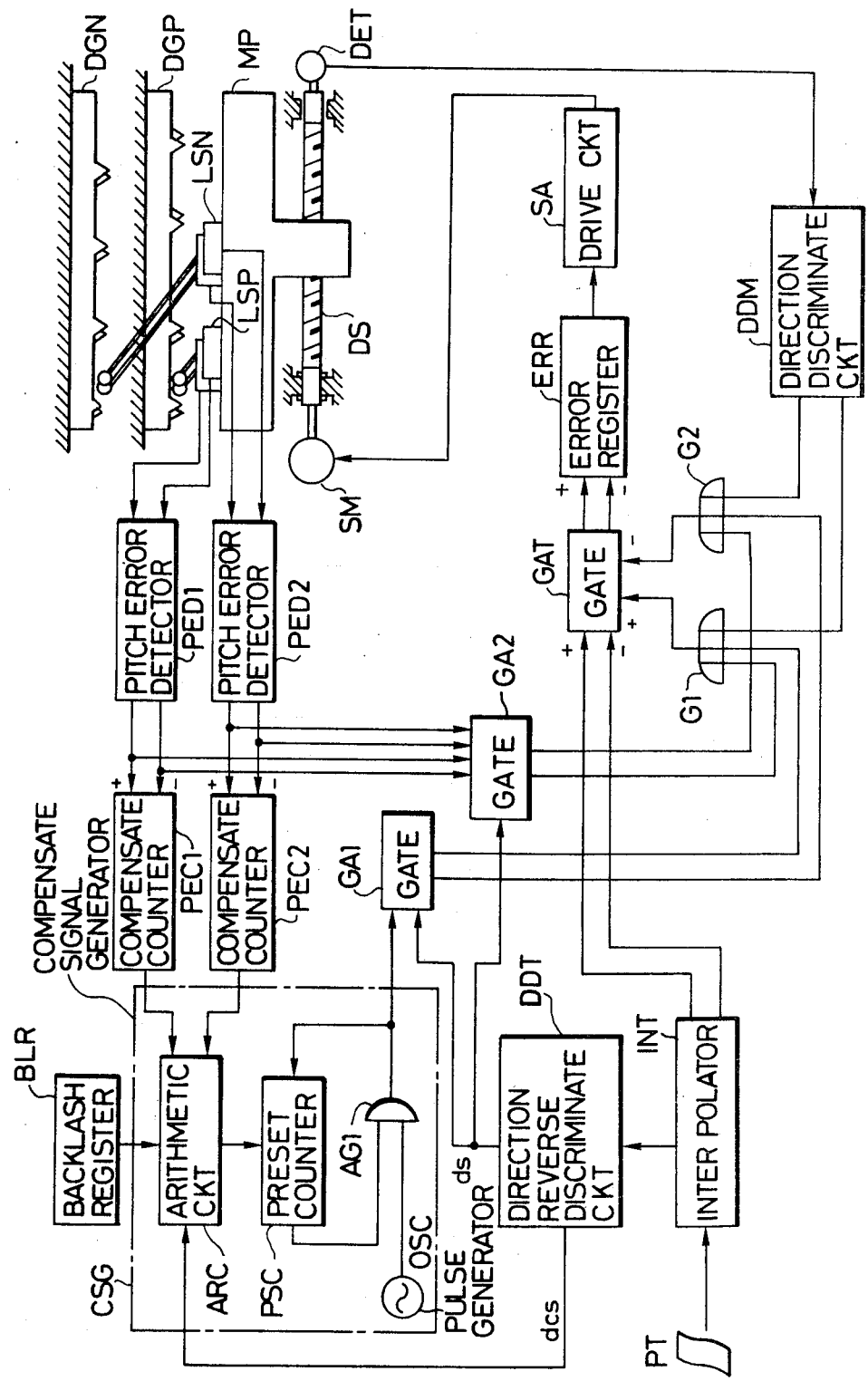
FIG. 6 is a diagram illustrating still another embodiment of this invention.

FIG. 6 illustrates in block form still another embodiment of this invention, in which parts corresponding to those in FIG. 2 are marked with the same reference characters and reference characters G1 and G2 indicate OR gates. In this embodiment, the OR gates G1 and G2 respectively obtain the logical sums of pulses applied thereto from the gate circuits GA1 and GA2 and the direction discriminate circuit DDM, and provide the logical sums to this gate circuit GAT. In the arrangement detection pulses from the detector DET are fed back to the error register ERR, the amount of feedback to the error register is corrected by compensation pulses corresponding to the direction of feed or the reversal of the direction of feed.

As has been described in the foregoing, this invention has error setting means, such as the forward and backward feed dogs DGP and DGN or forward and backward feed tables TP and TN, corresponding to the travel of the movable machine part MP in the forward and backward directions; a positioning error of the movable machine part MP relative to a command value is premeasured corresponding to the direction of travel and error information corresponding to the position of the movable machine part MP is set up by the error setting means. Furthermore, error information integrating means, such as the compensate counters PEC1 and PEC2 or registers REP and REN, are provided, and in the case of a forward travel command, the error information set by the forward error setting means is read out to compensate for the error and in the case of a backward travel command, the error information set by the backward error setting means is read out for the error compensation. Upon reversal of the direction of travel, error information integrated by integrating means and the amount of backlash are added together to effect an error compensation. Also when errors differ with the directions of travel and the positions of the movable machine part MP, the errors can be completely compensated for. Accordingly, even if the inexpensive feed screw DS is employed, numerical control can be achieved with great accuracy.

It will be apparent that many modifications and variations may be effected without departing from the scope of novel concepts of this invention.

What is claimed is:

1. A numerical control error compensating system having an error setting means for setting error information corresponding to the position of a movable machine part, the error information being obtained by premeasuring a positioning error relative to a command value, such that when the movable machine part is moved, the error information set in the error setting means is read out therefrom to compensate for the error, wherein the improvement comprises an error setting means for setting error information corresponding to forward and backward movements of the movable machine part such that when the movable machine part is moved the error information is provided for each of the forward and backward movements of the movable machine part; integrating means, operatively connected to said error setting means, for integrating the error information and for providing an integrated output, said integrating means comprising a first compensate counter for counting error information resulting from the forward movement of the movable machine part and a second ompensate counter for counting error information resulting from the backward movement of the movable machine part; backlash means, operatively connected to said integrating means, for providing a backlash constant representing the amount of backlash, wherein when the movable machine part is moved upon application of the command value, the error compensation is achieved based on the error information read out from the error setting means corresponding to the commanded direction of movement of the movable machine part, and that when the direction of movement of the movable machine part is reversed, the integrated output of the integrating means is added to the backlash constant for error compensation.

2. A numerical control error compensating system according to claim 1, wherein the error setting means comprises at least one pair of dogs corresponding to the forward and backward movements of the movable machine part respectively.

3. A numerical control error compensating system according to claim 1, wherein the error setting means comprises a plurality of tables corresponding to the forward and backward movements of the movable machine part.

4. A numerical control error compensating system having an error setting means for setting error information corresponding to the position of a movable machine part, the error information being obtained by premeasuring a positioning error relative to a command value, such that when the movable machine part is moved, the error information set in the error setting means is read out therefrom to compensate for the error, wherein the improvement comprises an error setting means for setting error information corresponding to forward and backward movements of the movable machine part such that when the movable machine part is moved the error information is provided for each of the forward and backward movements of the movable machine part, said error setting means comprising a plurality of tables corresponding to the forward and backward movements of the movable machine part; integrating means, operatively connected to said error setting means, for integrating the error information and for providing an integrated output, said integrating means comprising a plurality of registers for integrating the error information respectively read out of the plurality of tables for the forward and backward movements of the movable machine part; backlash means, operatively connected to said integrating means, for providing a backlash constant representing the amount of backlash, wherein when the movable machine part is moved upon application of the command value, the error compensation is achieved based on the error information read out from the error setting means corresponding to the commanded direction of movement of the movable machine part, and that when the direction of movement of the movable machine part is reversed, the integrated output of the integrating means is added to the backlash constant for error compensation.

5. A numerical control error compensating system, for a movable machine part shiftable on a feed screw, comprising:

an error setting means for determining and storing error information corresponding to the forward and backward movements of said movable machine part, and for providing an error information signal when said movable machine part is moved;

a backlash register means, for providing a backlash constant representing the amount of backlash present when said movable machine part changes directions;

integrating means, operatively connected to said error setting means and to said backlash register means, for integrating said backlash constant and said error information signal when the direction of said feed screw is reversed, and for providing an integrated error information output signal, said integrating means comprising a first compensate counter for counting error information resulting from the forward movement of said movable machine part and a second compensate counter for counting error information resulting from the backward movement of said movable machine part;

drive means, operatively connected to said error setting means, said integrating means and said feed screw, for driving said feed screw in dependence upon said error information signal and said integrated error information output signal.

6. A numerical control error compensating system as set forth in claim 5, wherein said error setting means comprises at least one pair of dogs corresponding to the forward and backward movements of said movable machine part, respectively.

7. A numerical control error compensating system as set forth in claim 5, wherein said error setting means comprises a plurality of tables corresponding to the forward and backward movements of said movable machine part.

8. A numerical control error compensating system, for a movable machine part shiftable on a feed screw, comprising:

an error setting means for determining and storing error information corresponding to the forward and backward movements of said movable machine part, and for providing an error information signal when said movable machine part is moved, said error setting means comprising a plurality of tables corresponding to the forward and backward movements of said movable machine part;

a backlash register means, for providing a backlash constant representing the amount of backlash present when said movable machine part changes direction;

integrating means, operatively connected to said error setting means and to said backlash register means, for integrating said backlash constant and said error information signal when the direction of said feed screw is reversed, and for providing an integrated error information output signal, said integrating means comprising a plurality of registers for integrating the error information read out from said plurality of tables;

drive means, operatively connected to said error setting means, said integrating means and said feed screw, for driving said feed screw in dependence upon said error information signal and said integrated error information output signal.

9. A numerical control error compensating system, for a movable machine part shiftable on a feed screw, comprising:

first and second dogs;

a pulse generator for generating pulses;

a backlash register, operatively connected to receive a backlash constant, for storing and outputting said backlash constant;

first and second limit switches, connected to said movable machine part and positioned to come into contact with said first and second dogs respectively, for providing first and second limit signals when said first and second limit switches contact said first and second dogs;

first and second pitch error detector circuits, operatively connected to said first and second limit switches respectively, for providing a first and second pitch compensation pulse signal in dependence upon the order of said first and second limit signals;

first and second compensate counter means, operatively connected to said first and second pitch error detectors respectively, for provding first and second count value signals;

an arithmetic circuit, operatively connected to said first and second compensate counter means and to said backlash register, for providing a sum signal equal to the sum of said backlash constant, said first count value signal, and second count value signal;

a preset counter means, operatively connected to said arithmetic circuit, for storing said sum signal and for providing a counter pulse signal until said sum signal is counted down to zero;

a first AND gate, operatively connected to said preset counter and said pulse generator, for providing a pulse output signal, said pulse output signal is inputted to said preset counter means;

a direction reverse discriminate circuit, operatively connected to said arithmetic circuit, for providing a direction reverse signal to actuate said arithmetic circuit and for providing a direction output signal;

an interperlator circuit, operatively connected to said direction reverse discriminate circuit, for providing a travel command value signal;

a command tape, operatively connected to said interperlator circuit, for providing said travel command value signal and a direction of travel signal to said interperlator circuit;

a first gate, operatively connected to said first AND gate and to said direction reversed discriminate circuit, for receiving said pulse output signal and said direction output signal and for providing a compensation pulse signal;

a second gate, operatively connected to said first and second pitch error detector circuits and to said direction reverse discriminate circuit, for receiving said pitch compensation pulse signal and said direction output signal and for providing a gated compensation pulse signal in dependence upon said direction output signal;

error input means, operatively connected to said first gate, said second gate and said interperlator circuit, for receiving said gated compensation pulse signal, said compensation pulse signal, and said travel command value signal, and for providing an error signal;

error register means, operatively connected to said error input means, for receiving said error signal and for providing a drive signal;

a drive circuit, operatively connected to said error register means, for receiving said drive signal and for providing a motor input signal;

a servo motor, operatively connected to said drive circuit and said feed screw, for driving said feed screw in dependence upon said motor input signal;

a detector circuit, operatively connected between said feed screw and said error input means, for providing a detection pulse signal to said error input means.

10. A numerical control error compensating system as set forth in claim 9, wherein said error input means comprises:

first and second OR gates, each of which is operatively connected to said first gate and said interperlator circuit, for receiving said compensation pulse signal and said travel command value signal, and for providing first and second OR signals respectively;

a third OR gate, operatively connected to said second gate and said first OR gate for receiving said gated compensation pulse signal and said first OR signal, and for providing a third OR signal;

a fourth OR gate, operatively connected to said second gate and said second OR gate, for receiving said gated compensation pulse signal and said second OR signal, and for providing a fourth OR signal;

a third gate, operatively connected to said third and fourth OR gates and to said error register means, for receiving said third and fourth OR signals and for providing said error signal to said error register means;

a direction discriminate circuit, operatively connected between said detector circuit and said third gate, for receiving said detection pulse signal and for providing a feed direction signal to said third gate.

11. A numerical control error compensating system as set forth in claim 9, wherein said error input means comprises:

a direction discriminate circuit, operatively connected to said detector circuit, for receiving said detection pulse signal and for providing a feed direction signal;

first and second OR gates, each of which is operatively connected to said first gate, said second gate and said direction discriminate circuit, for receiving said compensation pulse signal, said gated compensation pulse signal and said feed direction signal, and for providing first and second OR signals respectively;

a third gate, operatively connected to said interperlator circuit, and first and second OR gates, and said error register means, for receiving said travel command value signal and said first and second OR signals, and for providing said error signal to said error register means.

* * * * *

UNITED STATES PATENT AND TRADEMARK OFFICE
CERTIFICATE OF CORRECTION

PATENT NO. : 4,251,761

DATED : February 17, 1981

INVENTOR(S) : TSUYOSHI INOUE

It is certified that error appears in the above—identified patent and that said Letters Patent is hereby corrected as shown below:

Front Page, [75] Inventor, "Hino" should be --Tokyo--;
[73] Assignee, "Hino" should be --Tokyo--.

Col. 1, line 22, "high-" should be --large- --;
line 23, "large" should be --high--;
line 29, "so" should be --so on--;
line 40, "after "is" insert --based--.

Col. 2, line 12, "of the" should be --the--;
line 33, "a" should be --$a$-- (Italics);
line 35, "b" should be --$b$-- (Italics).

Col. 4, line 21, "Ac-" should be --ac- --;
line 29, "Indicates" should be --indicate--.

Col. 5, line 1, "are carried" should be --is carried--, and "results is" should be --results are--;
line 19, "to this" should be --to the--, and "In the" should be --In this--.

Col. 6, line 8, "ompensate" should be --compensate--.

UNITED STATES PATENT AND TRADEMARK OFFICE
CERTIFICATE OF CORRECTION

PATENT NO. : 4,251,761
DATED : February 17, 1981
INVENTOR(S) : TSUYOSHI INOUE

It is certified that error appears in the above—identified patent and that said Letters Patent is hereby corrected as shown below:

Col. 8, line 25, "provding" should be --providing--;
 line 31, after "and" insert --said--;
 lines 44, 50 and 64, "interperlator" should be --interpolator--;
 line 48, "perlator" should be --polator--.

Col. 9, line 18, "interper-" should be --interpo- --.

Col. 10, line 25, "interperla-" should be --interpola- --;
 line 26, "and first" should be --said first--.

Signed and Sealed this

Twenty-ninth Day of September 1981

[SEAL]

Attest:

GERALD J. MOSSINGHOFF

Attesting Officer    Commissioner of Patents and Trademarks